United States Patent

Billieres

[11] Patent Number: 5,849,117
[45] Date of Patent: Dec. 15, 1998

[54] TIRE WITH RADIAL CARCASS REINFORCEMENT HAVING SPECIFIED TURN-UP

[75] Inventor: Jean Billieres, Clermont-Ferrand, France

[73] Assignee: Compagnie Generale des Etablissements Michelin-Michelin & Cie, Clermont-Ferrand, France

[21] Appl. No.: 849,162
[22] PCT Filed: Nov. 21, 1995
[86] PCT No.: PCT/EP95/04582
§ 371 Date: May 29, 1997
§ 102(e) Date: May 29, 1997
[87] PCT Pub. No.: WO96/17734
PCT Pub. Date: Jun. 13, 1996

[30] Foreign Application Priority Data

Dec. 5, 1994 [FR] France ................................ 94 14688

[51] Int. Cl.⁶ .......................... B60C 15/00; B60C 15/06
[52] U.S. Cl. .................... 152/543; 152/539; 152/542; 152/550; 152/552; 152/553
[58] Field of Search ................. 152/550, 552, 152/553, 560, 539, 542, 543

[56] References Cited

U.S. PATENT DOCUMENTS 4,580,610  4/1986  Jackson .

FOREIGN PATENT DOCUMENTS 3600145   7/1987   Germany .
WO8204225 12/1982  WIPO .
WO9509090  4/1995  WIPO .

OTHER PUBLICATIONS

Patent Abstracts of Japan, vol. 017 No. SYI (M–1488), 29 Sep. 1993 & JP, A, 05–147413 (Sumitomo Rubber Ind Ltd), 15 Jun. 1993.

*Primary Examiner*—Adrienne C. Johnstone
*Attorney, Agent, or Firm*—Baker & Botts, L.L.P.

[57] ABSTRACT

A tire has a radial carcass reinforcement which is anchored in each bead to a bead ring, going from the outside to the inside, forming a turn-up which is substantially parallel to the generatrix of the rim seat J on which the bead is mounted. Each turn-up is reinforced by at least one additional reinforcing ply of cords oriented at an angle between 0° and 20° with respect to the circumferential direction.

4 Claims, 1 Drawing Sheet

TIRE WITH RADIAL CARCASS REINFORCEMENT HAVING SPECIFIED TURN-UP

BACKGROUND OF THE INVENTION

The present invention relates to a tire with radial carcass reinforcement without independent inner tube and, more particularly, a tire intended for the equipping of heavy vehicles such as trucks, subway trains, and tractor-trailer combinations.

Such tires are mounted on two types of rim, namely: the so-called drop center rims having frustoconical seats inclined with respect to the axis of rotation and forming with said axis an angle which may vary between 5° and 15°, and rims with flat or substantially flat base, having seats inclined either by 0° or 5° with respect to the axis of rotation.

The so-called drop center rims comprise a mounting groove the diameter of which is definitely less than the nominal diameter of the rim. This inside diameter of the rim is considered by the users to be too small and it does not make it possible to select brake drums of dimensions suitable for an effective braking of an increasingly more powerful vehicle.

It is therefore highly desirable to increase the diameter of the rim base and, insofar as possible, to do so without increasing the overall diameter of the rolling assembly, which is equivalent to lowering the aspect ratio H/S of the tire, H being the height of the tire on the rim and S its maximum axial width.

In other cases, it is advantageous to decrease the overall diameter of the rolling assembly formed by the tire and the rim without decreasing the diameter of the rim and, in particular, in order to lower the center of gravity of the trailers or semi-trailers pulled. A tire whose aspect ratio H/S decreases while retaining substantially the standard maximum width represents a solution to the above problem.

The development of heavy vehicle tires with aspect ratios of less than 0.8 is very difficult; in particular, the overall strength of the beads becomes definitely less as the ratio H/S decreases, the inadequacies in strength being present at the level of the ends of turn-ups of the carcass reinforcement or the ends of reinforcement plies located in the beads of the tire, the architecture of said beads being an ordinary architecture with, in each bead, a carcass reinforcement turn-up and reinforcement plies the meridian profiles of which are substantially parallel to the meridian profile of the carcass reinforcement in the zone of said beads. Furthermore, such an architecture results in a substantial lack of comfort, which is particularly disagreeable upon long trips on relatively rough roads.

U.S. Pat. No. 5,688,345 proposes remedying such drawbacks. It concerns a tire the radial carcass reinforcement of which is wound in each bead around the bead ring going from the outside to the inside of the tire so as to form a turn-up which, seen in meridian section, is located within an angle defined by two half lines tangent to the bead ring, the half line closest to the axis of rotation being parallel to said axis and said angle being at most equal to 45°.

For reasons of economy, such a turn-up is arranged in an axially inner protuberance of the tire. While an actual saving is obtained with respect to the material, the manufacture of such a tire, which takes longer, is more complicated requires greater precision and is expensive.

SUMMARY OF THE INVENTION

In order to reduce the industrial cost of manufacture, the present invention proposes a tire with radial carcass reinforcement surmounted radially by a crown reinforcement, the carcass reinforcement being composed of at least one ply of threads or cords and being turned up in each bead around an anchoring bead ring going from the outside to the inside so as to form a turn-up, said turn-up being reinforced by at least one additional reinforcing ply of cords oriented at an angle between 0° and 20° with respect to the circumferential direction, the value 0° being included within said range, which is characterized by the fact that the meridian profile of the said reinforced turn-up is linear and substantially parallel to the meridian profile of at least the rim seat portion located axially inwards of the projection of the center of the circle circumscribed on the bead ring on said rim seat.

By substantially parallel to the rim portion there is to be understood the turn-up profile forming with the axis of rotation of the tire an angle of between the value equal to the generatrix of said rim portion less 5° and the value equal to said angle of the generatrix plus 5°.

Preferably, the carcass ply turn-up will be anchored between two additional reinforcement plies arranged radially on both sides of said turn-up and formed of circumferentially oriented metal cables.

It is furthermore advantageous to provide, axially on the outside and/or inside of the carcass reinforcement at the level of the rim flange, an additional reinforcement armature formed of at least one reinforcement ply formed of metal or textile thread or cord and oriented at an angle of between 0° and 30° with respect to the circumferential direction, the angle of 0° being included within the range in question.

In order to obtain a satisfactory overall strength of the beads of the tire in the event of travel with substantial heating of said beads (heat coming from the mounting rim), the turn-up will preferably have an axial width, measured parallel to the axis of rotation and axially from the point of tangency O of the carcass reinforcement with the circle circumscribed on the bead ring which is equal to at least 0.06 times the maximum axial width S of the tire mounted on its service rim and inflated to its recommended nominal pressure.

DESCRIPTION OF THE DRAWING

Referring to the accompanying drawing, which contains only a single figure, a non-limitative example is described, said figure being a diagrammatic view in meridian section of a tire bead in accordance with the invention, mounted on its service rim.

DESCRIPTION OF PREFERRED EMBODIMENTS

Figure 1:
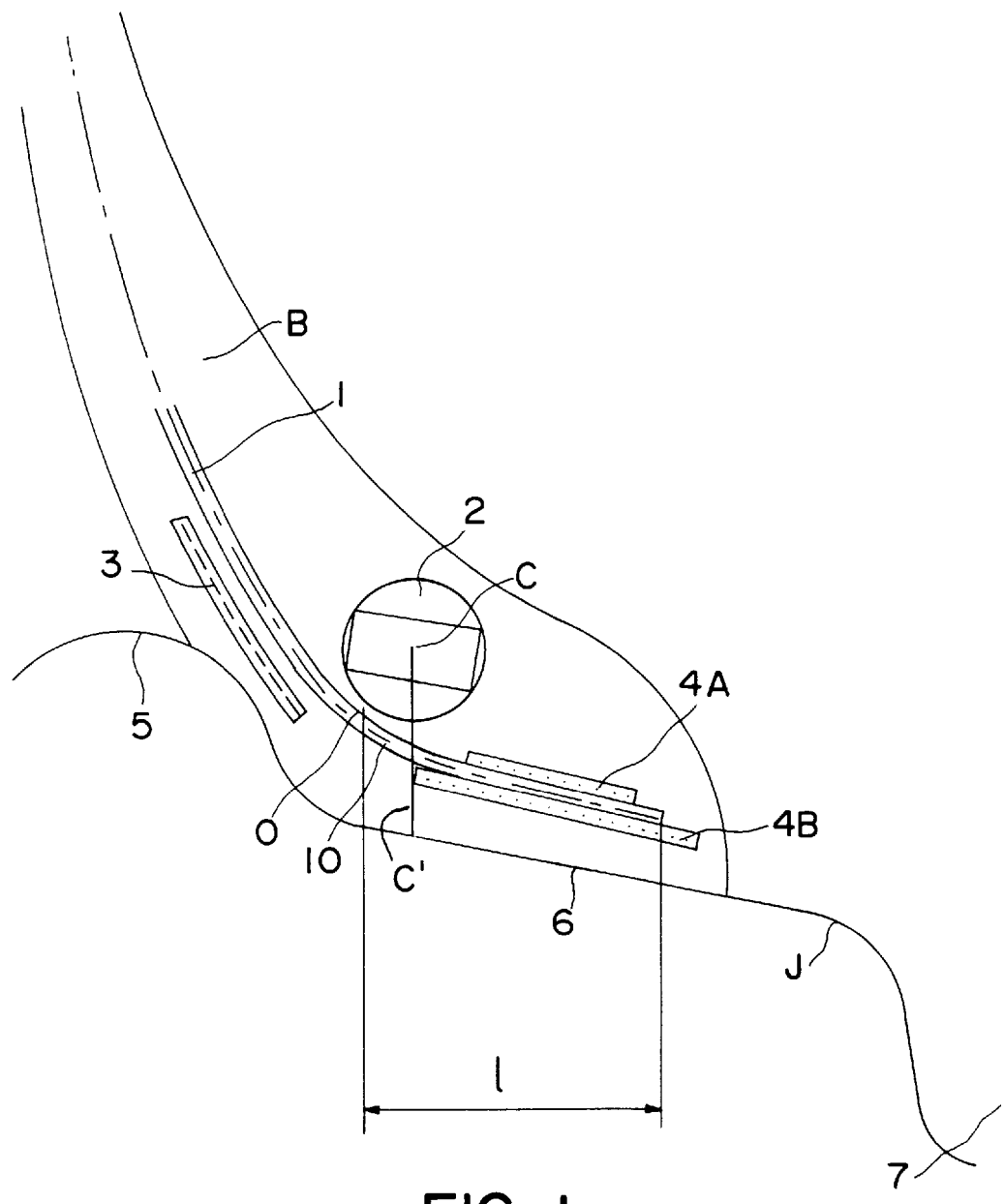

A 295/60 R 22.5 X tire is inflated to its recommended nominal pressure and mounted on its service rim J, formed on each side by a rim flange 5 extended axially to the inside by a rim seat 6 the frustoconical generatrix of which forms an angle of 15° with a line parallel to the axis of rotation, the two rim seats being connected to a rim base having the mounting groove 7. On each side of the rim J, there is mounted a bead B of the tire in question. In said bead, the carcass reinforcement 1, formed of a single metal ply, is turned up around a bead ring 2 having rectangular wires, it going from the outside to the inside so as to form a turn-up.

This turn-up 10 has a linear meridian profile parallel to the frustoconical generatrix of the portion of the rim seat located axially to the inside of the projection C' of the center C of the circle circumscribed on the bead ring 2 and forming an angle of 15° with the axis of rotation. The manufacture of such beads does not make it possible to say that the angle formed by the meridian profile of said turn-up with the axis of rotation will be an angle strictly equal to 15°, but said angle will however certainly be within the range of 10° to 20°.

The turn-up 10 of the carcass ply 1 has an axial width which is equal to 0.08 times the maximum axial width S of the tire in question.

On and below the turn-up 10 there are arranged plies 4A and 4B of metal cables forming a zero angle with the circumferential direction. The axially inner end of the radially upper reinforcement ply 4A is slightly further from the equatorial plane than the end of the turn-up 10 of the carcass ply 1, while the axially inner end of the radially lower reinforcement ply 4B is slightly closer to the equatorial plane than the end of the turn-up 10.

As to the carcass reinforcement 1, radially at the level of the rim flange 5 it is reinforced by the presence axially to the outside of a reinforcement ply 3 of metal cables oriented at an angle equal in the example described to 20° with respect to the circumferential direction.

A tire such as is described above is advantageously produced by a method of manufacture such as that described in U.S. Pat. No. 5,700,339.

I claim:

1. A tire with radial carcass reinforcement (1) which is surmounted radially by a crown reinforcement, the tire being inflated to its recommended nominal pressure and mounted on its service rim, formed on each side by a rim flange (5) extended axially to the inside by a rim seat (6), the carcass reinforcement (1) being formed of at least one ply of threads or cords and being turned up in each bead around an anchoring bead ring (2), going from the outside to the inside, so as to form a turn-up (10), said turn-up (10) being reinforced by at least one additional reinforcement ply (4A, 4B) of cables oriented at an angle of between 0° and 20° with respect to the circumferential direction, the value 0° being included within said range, the tire characterized by the fact that the meridian profile of said reinforced turn-up (10) is linear and substantially parallel to the meridian profile of at least the portion of the rim seat axially to the inside of the projection C' of the center (C) of the circle circumscribed on the bead ring onto said rim seat.

2. A tire according to claim 1, characterized by the fact that said at least one additional reinforcement ply is two additional reinforcement plies (4A, 4B), disposed radially on opposite sides of said turn-up (10) and formed of circumferentially oriented metal cables.

3. A tire according to claim 1, characterized by the fact that each turn-up (10) has an axial width l, measured parallel to the axis of rotation and axially from the point of tangency O of the carcass reinforcement (1) with the circle circumscribed on the bead ring (2), which is equal to at least 0.06 times the maximum axial width S of the tire mounted on its service rim J and inflated to its recommended nominal pressure.

4. A tire according to claim 1, characterized by the fact that the carcass reinforcement (1) radially at the level of the rim flange (5) is reinforced by an additional reinforcement armature formed of at least one reinforcement ply (3) of metal or textile threads or cables and oriented at an angle of between 0° and 30° with respect to the circumferential direction.

* * * * *